(12) United States Patent
Barraco et al.

(10) Patent No.: US 6,509,425 B2
(45) Date of Patent: Jan. 21, 2003

(54) PROCESS FOR INTRODUCING A LIQUID IN A FLUIDIZED BED

(75) Inventors: Joseph Barraco, Martigues (FR); Jean-Louis Chamayou, Carry le Rouet (FR); Jean-Claude Chinh, St Mitre les Remparts (FR); Guillaume Demoustier, Arles (FR); Pierre Dugua, Arles (FR); Jean-Noel Large, Marseille (FR); Eric Madrid, Chateauneuf les Martigues (FR); Henry Morel, Lavera (FR); Ronald Sanchez, St Mitre les Remparts (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/984,562

(22) Filed: Oct. 30, 2001

(65) Prior Publication Data

US 2002/0123578 A1 Sep. 5, 2002

Related U.S. Application Data

(63) Continuation of application No. PCT/GB00/01502, filed on Apr. 18, 2000.

(30) Foreign Application Priority Data

Apr. 30, 1999 (FR) .............................. 9905666

(51) Int. Cl.$^7$ ................................. C08F 2/34
(52) U.S. Cl. ................. 526/68; 422/139; 261/127; 222/3; 239/87; 239/88; 239/95
(58) Field of Search .................. 526/68, 961; 422/139; 261/127; 222/3; 239/87, 88, 95

(56) References Cited

U.S. PATENT DOCUMENTS 2,164,411 A * 7/1939 Kennedy et al.

FOREIGN PATENT DOCUMENTS

| DE | 369454 | 2/1923 |
| WO | WO 94/28032 | 12/1994 |
| WO | WO 98/18548 | 5/1998 |

* cited by examiner

*Primary Examiner*—David W. Wu
*Assistant Examiner*—William Cheung
(74) *Attorney, Agent, or Firm*—Finnegan, Henderson, Farabow, Garrett and Dunner, L.L.P.

(57) ABSTRACT

Process for the introduction of liquid into a continuous process for the gas-phase polymerization of a olefin monomer and one or more other alpha-olefins in a fluidized-bed reactor, the liquid being introduced by at least one nozzle having a feed pipe and a sleeve sliding inside and at the end of the pipe, the position of the said sleeve along the feed pipe being determined by the pressure of the feed liquid and the return force of a preloaded spring, the spring having one end fixed to the sleeve and the other end to the feed pipe, the sleeve being provided with one or more recesses along its surface for sliding with the feed pipe, the recesses emerging in a groove around the circumference of the sleeve and below a circular stop integral with the same sleeve, the stop resting, when the nozzle is not in use, on a rim of the end of the feed pipe, the rim and the circular stop of the sleeve each being provided with a bearing surface, the contact area of which is minimized to allow good sealing.

12 Claims, 3 Drawing Sheets

PROCESS FOR INTRODUCING A LIQUID IN A FLUIDIZED BED

RELATED APPLICATION

This application is a continuation of International Application No. PCT/GB00/01502, filed Apr. 18, 2000.

BACKGROUND OF THE INVENTION

The present invention relates to a process for the introduction of a condensed liquid into a reactor for the gas-phase (co)polymerisation of ethylene and/or propylene in a fluidised bed.

It is known to polymerise one or more monomers in the gas phase at a pressure greater than atmospheric pressure in a fluidised-bed reactor in which polymer particles being formed are maintained in the fluidised state by virtue of a reaction gas mixture which contains the monomer or monomers to be polymerised and flows as an ascending stream. The polymer thus manufactured in the form of powder is generally withdrawn from the reactor so as to maintain the bed with a more or less constant volume. A preferred industrial-scale process uses a fluidising grid which distributes the reaction gas mixture through the bed and which serves as a support for the bed should the flow of ascending gas be cut off. The reaction gas mixture leaving the top of the fluidised-bed reactor is recycled into the base of the latter beneath the fluidising grid via an external circulation pipe provided with a compressor.

The polymerisation of monomers is an exothermic reaction. It is therefore necessary to provide a means suitable for cooling the bed so as to extract the heat of polymerisation therefrom. The preferred method for the fluidised-bed polymerisation of ethylene and/or propylene consists in cooling the reaction gas mixture below the polymerisation temperature, thereby making it possible, while this fluidising gas is passing through the bed, to compensate for the excess heat generated by the polymerisation. Thus, during its return, the reaction gas mixture is generally cooled using at least one heat exchanger placed in the external circulation pipe so as to extract the heat produced by the polymerisation reaction and to maintain the polymerisation temperature at the desired level.

Attempts have been made, most particularly in recent years, to optimise the gas-phase polymerisation process so as to increase the production of polymer in existing plants. The rate of polymer production has therefore been studied, namely in terms of efficiency by weight of polymer produced per unit volume of the reactor and per unit time (kg/h/m3). In commercial fluidised-bed reactors of the above mentioned type, it is known that the rate of production depends directly on the rate of removal of heat generated in the reactor. This rate of removal may be increased, for example by increasing the velocity of the fluidising gas and/or by reducing the temperature of the fluidising gas and/or by increasing the heat capacity of the fluidising gas.

The Patent Application WO 94/28032 discloses a gas-phase olefin polymerisation process in which the recycling gas stream is cooled to a temperature low enough to form a liquid and a gas. By separating the liquid from the gas and by introducing the liquid directly into the fluidised bed, the total amount of liquid introduced into the fluidised-bed reactor may be increased, which in turn allows better cooling of the bed by evaporation and therefore allows higher productivity levels to be achieved. Many methods for introducing the liquid into the fluidised bed have already been described.

The Patent Application WO 98/18548 discloses nozzles to inject a liquid in a fluidised bed comprising a pressurised liquid inlet and a liquid outlet in which a mechanical device is provided within the liquid outlet to atomise the liquid and the liquid outlet is provided with a spray-forming zone. When no liquid is injected, a gas is often used and injected instead of the liquid to avoid blockage by the powder in the fluidised bed. The introduction of a gas is often a constraint as it generates a larger purge out of the fluidised bed reactors in which those nozzle are used.

The U.S. Pat. No. 2,164,411 discloses a nozzle for the injection of a fluid under pressure, such as air or steam, into a container for pulverulent, granular or like material to aerate such material in and discharge the material from the container. The nozzle comprises a casing having an inlet opening adapted to be connected to a source of fluid under pressure, an outlet and a valve to control the discharge of the fluid through the casing. The casing of the nozzle comprises a stem slidably mounted in the casing, having a valve head fixed at one end to be seated against the valve set at the end of the casing. At the other end of the stem is fixed a piston head mounted within the casing, allowing the passage of the fluid by moving the valve head away from the valve seat. A mean to urge the valve head to be seated against the valve set is provided by a spring in order to shut off the inlet of the casing from the source of fluid under pressure. The nozzles described in the U.S. Pat. No. 2,164,411 have never been used for injecting a liquid, and even less for introducing a liquid into a fluidised bed.

The Patent Application WO 96/20780 discloses a method to inject a liquid directly into a fluidised bed by the use of a nozzle using an atomisation gas, for which the horizontal penetration of the liquid into the fluidised bed is in the range of 250 to 25000 and the pressure drop across the mixing chamber is in the range of 0.88 to 1.5 bar. It is highlighted that the relation between the area of the outlets and the flow rate through the nozzle as well as maintaining the required pressure drop is important in achieving the optimum penetration and dispersion of the liquid. The nozzles referred in the Patent Application WO 96/20780 do not allow a control of the liquid penetration. Only the cross section area of the orifices can be adapted to achieve the optimum penetration and dispersion of the liquid in accordance to the range of flow rate targeted.

The nozzles used to introduce a liquid in into a fluidised bed disclosed in the prior art have, for most of them, a problem linked to the length of the liquid jets that are generate and their impact with the fluidised bed. In order to maintain a bed of powder in a fluidised state, it is important that anywhere within the fluidised bed, the concentration of liquid does not go beyond a limit, above which the powder agglomerates and cannot be maintained fluidised. The present invention seeks to limit the length of the liquid jets in the fluidised bed to avoid impingement of the jets with, and accumulation of the liquid at, the internal wall of the fluidised bed reactor. The present invention also seeks to ensure that the length of the liquid jets are long enough to allow a good dispersion of the liquid in the fluidised bed and to avoid accumulation of the liquid near the nozzle outlet orifices.

SUMMARY OF THE INVENTION

A method has now been found to introduce a liquid into a fluidised bed reactor with at least a nozzle, this method allowing to limit the length of the liquid jet(s) in the fluidised bed, and more generally to control the length of the liquid jet(s) in accordance with the liquid flow rate through the nozzle. This method is particularly adapted for the introduction of a liquid in a continuous gas-phase polymerisation process in gaseous phase.

The invention relates to a process for the introduction of a liquid into a continuous process for the gas-phase polymerisation of an olefin monomer chosen from (a) ethylene, (b) propylene, (c) a mixture of them, and one or more other alpha-olefins in combination with (a), (b) or (c), in a fluidised-bed reactor, by continuously recycling the gas phase which supports the fluidised bed and passes through the latter, the said gas phase having been heated in contact with the polymerisation catalyst under reactive conditions and with polymer particles being formed, by cooling the said recycled gas phase, process characterised in that the liquid is introduced by means of at least one nozzle comprising a feed pipe (1) and a sleeve (2) sliding inside and at the end of the said pipe, the position of the said sleeve (2) along the feed pipe (1) being determined by the pressure of the feed liquid (3) and the return force of a preloaded spring (4), the said spring having one end fixed to the sleeve (2) and the other end to the feed pipe (1), the sleeve (2) being provided with one or more recesses (10) along its surface for sliding with the feed pipe (1), the said recesses (10) emerging in a groove (11) around the circumference of the sleeve (2) and below a circular stop (8) integral with the same sleeve (2), and characterised in that, i) when the pressure of the feed liquid (3) is not high enough to move the sleeve (2), the said stop (8) rests on a rim (9) of the end of the feed pipe (1) making it possible for the introduction of the said liquid (3) to be stopped or for it to be kept stopped, the said rim (9) and the circular stop (8) of the sleeve each being provided with a bearing surface (12) and (13), the contact area of which being minimised in order to allow good sealing, and, ii) when the pressure of the feed liquid (3) is high enough to move the sleeve (2), the said liquid (3) is conveyed by the recesses (10) as far as the groove (11) in the sleeve in order to be introduced towards the outside between the bearing surfaces, on the one hand, of the rim (9) of the end of the feed pipe (1) and, on the other hand, of the stop (8) of the sleeve (2).

BRIEF DESCRIPTION OF THE DRAWINGS

Appended

Appended

Appended

DETAILED DESCRIPTION OF THE INVENTION

Figure 1:
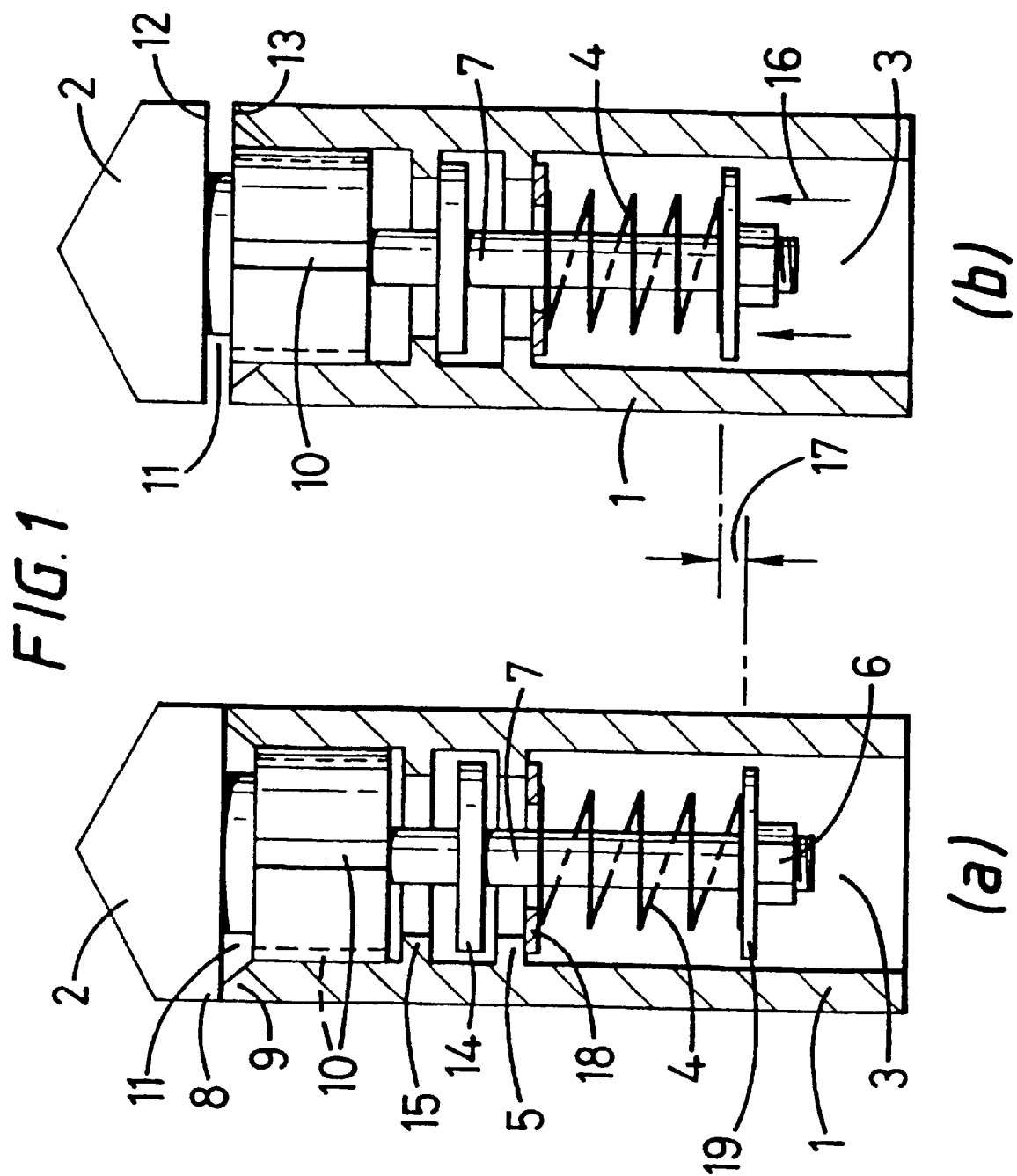
FIG. 1 illustrates diagrammatically a non-limiting example of a nozzle used in the process of the invention.

The present invention was found useful to inject any liquid or any material in dilution with a liquid into a fluidised bed.

A preferred embodiment of the present invention is to continuously recycle the gas phase which supports the fluidised bed and passes through the latter, by cooling the said recycled gas phase to a temperature at which some liquid condenses, by separating the said condensed liquid from the gas phase and by introducing said condensed liquid directly into the fluidised bed by the process of the invention.

According to the present invention, the nozzle comprises a feed pipe and a sleeve which slides inside and at the end of the said pipe. The feed pipe is able to conduct the feed liquid towards its end. The sleeve may have any dimensions, but they must be chosen in order to allow it to slide in the feed pipe. The upper part of the sleeve preferably has an ogival shape.

According to the present invention, the position of the sleeve along the feed pipe may be determined by the pressure of the feed liquid and the return force of a preloaded spring. The said sleeve may move in an approximately longitudinal direction along the feed pipe. Under the effect of the pressure of the feed liquid, the said sleeve tends to be pushed back towards the outside of the pipe. When the pressure is high enough, the said sleeve can actually be pushed back and partially moved out of the feed pipe. The expression "high-enough pressure" should be understood to mean the pressure necessary for the ensuing force to be greater than the return force corresponding to the setting of the spring.

According to the present invention, the preloaded spring has one end fixed to the sleeve and the other end to the feed pipe. The preloaded spring may be mounted by any suitable means, so as to produce its effect by working in compression or in relaxation. The ends of the preloaded spring may be fixed to the sleeve and to the feed pipe, either directly or else using one or more intermediate mechanical pieces. Any method of fixing may be used, such as fastening or by abutment.

For example, the preloaded spring may be fixed via its downstream end with respect to the feed pipe to this same pipe by abutment against an internal circular rim in the said pipe. The other end may be fixed by abutment with a nut screwed onto a rod fastened to the sleeve. In this example, the nut may be screwed onto the rod fastened to the sleeve by partially compressing the spring so as to keep a circular stop on the sleeve in bearing contact with the rim of the end of the pipe. In this case, the preloaded spring works in compression and its preloading corresponds to the initial compressive force of the preloaded spring, induced by tightening the nut on the rod. The setting pressure of the preloaded spring may be defined as the minimum pressure allowing the sleeve to move.

According to the present invention, the sleeve is provided with one or more recesses along its surface for sliding with the feed pipe. The sleeve is preferably provided with several recesses distributed in a uniform manner around the circumference of the sleeve. The number of recesses may be between 2 and 8, preferably between 4 and 6, for example 4. The cross-sectional area of the recesses must be sufficiently wide to prevent too great a pressure drop during flow of the feed liquid and to allow the flow of solid particles which may be in the said liquid. However, the cross-sectional area of the recesses must be limited in order to maintain a minimum speed of the feed liquid so as to prevent the deposition and accumulation of solid particles.

According to the present invention, the said recesses emerge in a groove on the circumference of the sleeve and below a circular stop integral with the same sleeve. The said groove must be sufficiently wide and deep to allow good distribution of the feed liquid around the circumference of the sleeve and to also allow the flow of solid particles which may be in the said liquid.

According to the present invention, the circular stop integral with the sleeve rests on a rim of the end of the feed pipe when the pressure of the feed liquid is not high enough to move the sleeve, thus making it possible for the introduction of the said liquid to be stopped or for it to be kept stopped, while still preventing the flow of solid particles from the reactor into the nozzle. The pressure of the feed liquid may not be high enough to move the sleeve if it generates a force of less than the return force of the spring corresponding to the preloading of the latter. Below this limit, that is to say below the setting pressure, and by virtue of the return force of the spring, the circular stop integral with the sleeve may be kept in contact with the rim of the end of the feed pipe.

According to the present invention, the rim of the end of the feed pipe and the circular stop of the sleeve are each provided with a bearing surface, the contact area of which is minimised in order to allow good sealing. The bearing surfaces are preferably plane. In order to minimise the said contact area, the bearing surface of the rim of the end of the feed pipe may be chamfered towards the inside of the said rim.

According to the present invention, when the pressure of the feed liquid is high enough to move the sleeve, the said liquid is conveyed by the recesses as far as the groove in the sleeve in order to be introduced towards the outside between the bearing surfaces, on the one hand, of the rim of the end of the feed pipe and, on the other hand, of the stop of the sleeve. The pressure of the feed liquid may be high enough to introduce the said liquid towards the outside when it generates a force greater than the return force of the spring corresponding to the preloading of the latter. Above this limit, that is to say above the setting pressure, the sleeve can be moved in order to allow introduction of the feed liquid between the bearing surfaces, on the one hand, of the rim of the end of the feed pipe and, on the other hand, of the stop of the sleeve. The surfaces on both sides of the bearing surfaces of the rim of the end of the feed pipe and of the stop of the sleeve may have a shape allowing the flow of the feed liquid to be optimised in terms of pressure drop, dispersion of the liquid jet produced outside the nozzle and penetration of the said jet.

According to one variant of the present invention, it is possible to limit movement of the sleeve by a blocking device. This device may be a ring fastened to the rod, which is itself fastened to the sleeve, the said ring bearing on a stop of the feed pipe when the sleeve reaches its point of maximum travel.

When the feed liquid is introduced to the fluidised bed through the nozzle, a feed liquid jet may be formed in the fluidised bed.

In order to design a nozzle operating within a given range of flow rates, and for which the length of the jet of feed liquid must be limited, account may be taken of a parameter such as: the maximum of the opening clearance of the nozzle, that is to say the maximum clearance of the opening between the bearing surfaces of the rim of the end of the feed pipe and of the stop of the sleeve. Other parameter may also be taken into account such as the stiffness of the spring and the preloading of the latter.

The length of the feed liquid jet in the fluidised bed is mainly a function of, and vary in the same direction as, the feed liquid pressure drop across the nozzle. The latter varies in accordance to the feed liquid flow rate across the nozzle and the cross section of the opening clearance of the nozzle.

It is possible to determine the trend of the feed liquid pressure drop across the nozzle versus the feed liquid flow rate.

Firstly, a minimum pressure of the feed liquid may be required in order to allow the feed liquid to flow through the nozzle. This minimum pressure usually corresponds to the setting pressure of the preloaded spring may be defined as preloading of the spring. The preloading can be preferably obtained by partially compressing the spring so as to keep a circular stop on the sleeve in bearing contact with the rim of the end of the pipe.

When the feed liquid pressure is greater than the setting pressure of the preloaded spring, the feed liquid starts to flow through the nozzle. The opening clearance of the nozzle may vary in accordance to the flow rate of the feed liquid. The pressure drop of the feed liquid across the nozzle is a linear function of the feed liquid flow rate, having a gradient corresponding to the stiffness of the spring, and this as long as the maximum opening clearance of the nozzle has not been reached. Within this operating range, that can be defined as a linear operating range, the liquid feed pressure drop through the nozzle is limited (by the linear variation as a function of the feed liquid flow rate) and so is the length of the feed liquid jet in the fluidised bed. By optimising the stiffness of the spring and the maximum opening clearance of the nozzle, it is possible to control the length of feed liquid jet in the fluidised bed by prediction of the feed liquid pressure drop through the nozzle.

Beyond the linear operating range, that is to say when the nozzle has reached its maximum opening clearance, the feed liquid pressure drop through the nozzle increases substantially faster with the feed liquid flow rate and consequently the same apply to the length of the feed liquid jet in the fluidised bed.

According to the process claimed in the present invention, the nozzle described above is used for the introduction of a condensed liquid into a continuous fluidised-bed gas-phase polymerisation reactor. The (co)polymerisation may be carried out using an olefin monomer chosen from (a) ethylene, (b) propylene, (c) a mixture of them, and one or more other alpha-olefins in combination with (a), (b) or (c). The gas phase, supporting the fluidised bed and flowing through the latter, being heated in contact with the polymerisation catalyst under reactive conditions and with polymer particles being formed, is recycled continuously and cooled to a temperature at which some liquid condenses. The said condensed liquid is preferably separated from the gas phase and introduced directly into the fluidised-bed reactor by means of one or more nozzles described above.

The (co)polymerisation is generally carried out by continuous or semi-continuous addition of a Ziegler-Natta-type catalyst comprising at least one transition metal, combined with a cocatalyst comprising an organometallic compound, for example an organoaluminium compound. The catalyst contains essentially an atom of a transition metal chosen from the metals of groups IV to VI of the Periodic Table of the elements, such as titanium, vanadium, chromium, zirconium or hafnium, optionally a magnesium atom and a halogen atom. It is also possible to use a metallocene-type Ziegler-Natta catalyst. The catalyst may be supported on a porous refractory oxide, such as silica or alumina, or may be combined with a solid magnesium compound, such as magnesium chloride, magnesium oxide, magnesium hydroxychloride or a magnesium alkoxide. A catalyst complexed with iron and/or cobalt may also be used, such as, for example, those described in Patent Application WO 98/27124 or WO 98/2638. It is also possible to use a catalyst essentially consisting of a chromium oxide activated by heat treatment and combined with a particulate support based on a refractory oxide.

The catalyst may be used in the form of a prepolymer powder prepared in advance during a prepolymerisation step from the catalysts described above. The prepolymerisation may be carried out by any process, for example prepolymerisation in a liquid hydrocarbon or in gas phase using a batch, semi-continuous or continuous process.

The catalyst or the prepolymer may be introduced into the reactor continuously or batch-wise.

The catalyst or the prepolymer may advantageously be introduced in the fluidised bed directly with the nozzle of the present invention. This introduction may be performed with any appropriate liquid, preferably the condensed liquid. This technique can lead to improved dispersion of the catalyst or prepolymer in the bed.

The nozzle or nozzles may be placed at any point in the fluidised-bed reactor and may be fed separately, in series or in parallel, by conventional devices. The nozzle or nozzles may be pointed in any direction.

The reactor comprises from 2 to 8, preferably from 4 to 6 nozzles.

These nozzles may be oriented in a vertical position, in which case they pass through the fluidising grid. The advantages is to have a dispersion of the liquid outside the nozzle which is a maximum (i.e. equal to 360 degrees) and which makes it possible to cover more amply the cross section of the fluidised bed. This is particularly advantageous for the process of the present invention so as to promote the vaporisation of the condensed liquid inside the reactor.

These nozzles may alternatively be oriented in an horizontal position, in which case they pass through the vertical wall of the reactor. The advantage of such a layout is to permit longer feed liquid jets in the fluidised bed. The feed liquid jets in the fluidised bed may advantageously have the shape of an horizontal hollow cone.

The nozzles layout in the fluidised bed is carried out in such a way that the orifices are indeed located within the fluidised bed, preferably in the lower part of the fluidised bed. By way of example, for a commercial reactor having a fluidised bed with a height ranging from 10 to 20 m above the grid, the orifices of the nozzles will be located above the said grid and below a height ranging from 3 to 7 m above the said grid.

The process and the device of the invention described above have many advantages.

One of the advantages is to be able to modify the opening between the bearing surfaces of the rim of the end of the feed pipe and of the stop of the sleeve as a function of the desired feed liquid flow rate, which in turn makes it possible to limit the length of the jet of the said liquid outside the nozzle. This makes it possible to operate the nozzle in an effective and optimum manner over a wide range of flow rates, without the need to have a minimum flow rate, combined with control of the length of the jets of feed liquid.

This is particularly advantageous for the process of the present invention in which it is very important to ensure that the jets of condensed liquid do not reach the walls of the polymerisation reactor.

Another advantage lies in the fact that, while still operating over a very wide range of flow rates, the powder in the fluidised-bed reactor is prevented from getting back into the nozzle. The use of a flushing gas for preventing solid particles in the reactor from flowing back into the nozzle is unnecessary and superfluous.

Yet another advantage lies in the fact that the fluctuations in the pressure of the feed liquid cause the sleeve to undergo a low-amplitude oscillatory motion in the feed pipe. These fluctuations inherent in the pumping system used thus make it possible to limit the risk of blockage of the sleeve in the feed pipe.

The process of the invention is particularly advantageous when it is desired to take one or more nozzles temporarily out of service. This operation may not be envisaged with other nozzles which must always be kept in use in order to prevent backflow of the powder.

The claimed process applied to fluidised-bed polymerisation offers a considerable technical and economic advantage by the fact that it allows effective control of the polymerisation reaction both in terms of the thermal standpoint and in terms of the polymerisation conditions.

By virtue of this process, large-size reactors can be used at the industrial stage.

By way of example, the fluidised-bed polymerisation of ethylene was carried out using four nozzles as described above and illustrated diagrammatically in the appended figure.

The general conditions of the polymerisation are those described below:

| Grade of the polymer: | HDPE 1 | HDPE 2 |
|---|---|---|
| Temperature of the fluidised-bed reactor: | 91° C. | 104° C. |
| Pressure of the fluidised-bed reactor: | 23.5 bara | 23.5 bara |
| Composition of the gas phase of the said reactor: | | |
| mass % of ethylene: | 31% | 29.7% |
| mass % of hydrogen: | 20% | 13.4% |
| mass % of 1-butene: | 0.3% | 0% |
| mass % of pentane: | 5.7% | 8.8% |
| mass % of nitrogen: | 43% | 48.1% |
| Temperature of the gas phase at the reactor inlet: | 36° C. | 46° C. |
| Fluidisation velocity: | 65 cm/s | 64 cm/s |
| Mass production of polyethylene: | 28.5 T/h | 25 T/h |
| Mass flow rate of condensed liquid per nozzle: | 17.6 T/h | 11.5 T/h |

At the end of the trial, after removing the nozzle it was found that the latter contained no trace of fluidisation solid nor of encrusting.

The appended FIG. 1 constitutes a non-limiting example of a nozzle according to the process of the present invention.

FIG. 1(*a*) represents a nozzle in "an out of action" configuration and FIG. 1(*b*) a nozzle in use showing the maximum opening clearance.

This device is a nozzle for the introduction of a liquid, which comprises a feed pipe (1) and a sleeve (2) which slides inside and at the end of the said pipe (1). The position of the said sleeve along the feed pipe (1) is determined by the pressure of the feed liquid (3) and the return force of a preloaded spring (4).

The preloaded spring (4) may be fixed via its downstream end with respect to the feed pipe to this same pipe (1) by abutment, by means of a hollow circular piece (18), against an internal circular rim (5) in the said pipe. The other end may be fixed by abutment against another circular piece (19) held in place by a nut (6) screwed onto a rod (7) fastened to the sleeve. In this example, the nut (6) may be screwed onto the rod (7) fastened to the sleeve by partially compressing the spring (4) so as to keep a circular stop (8) on the sleeve in bearing contact with the rim (9) of the end of the pipe (1). In this case, the spring (4) works in compression and its preloading corresponds to the initial compressive force of the spring (4), induced by tightening the nut (6) on the rod.

The sleeve (2) is provided with recesses (10) along its surface for sliding with the feed pipe (1). The said recesses

(10) emerge in a groove (11) on the circumference of the sleeve and below a circular stop (8) integral with the same sleeve.

When the nozzle is not in use, the circular stop (8) rests on the rim (9) of the end of the feed pipe. The said rim (9) and the circular stop (8) of the sleeve are provided with a bearing surface (12) and (13), the contact area of which is minimised to allow good sealing.

When the pressure, represented by the arrow (16), of the feed liquid (3) is high enough to move the sleeve (2), the said liquid is conveyed by the recesses (10) as far as the groove (11) in the sleeve in order to be introduced towards the outside between, on the one hand, the bearing surfaces (12) and (13) of the rim (9) of the end of the feed pipe and, on the other hand, of the stop (8) of the sleeve.

The movement of the sleeve (2) is limited by a blocking device. This device may be a ring (14) fastened to the rod (7), which itself is fastened to the sleeve (2), the said ring (14) bearing against a stop (15) in the feed pipe (1) when the sleeve (2) reaches its point of maximum travel, represented by the double arrow (17).

Figure 2:
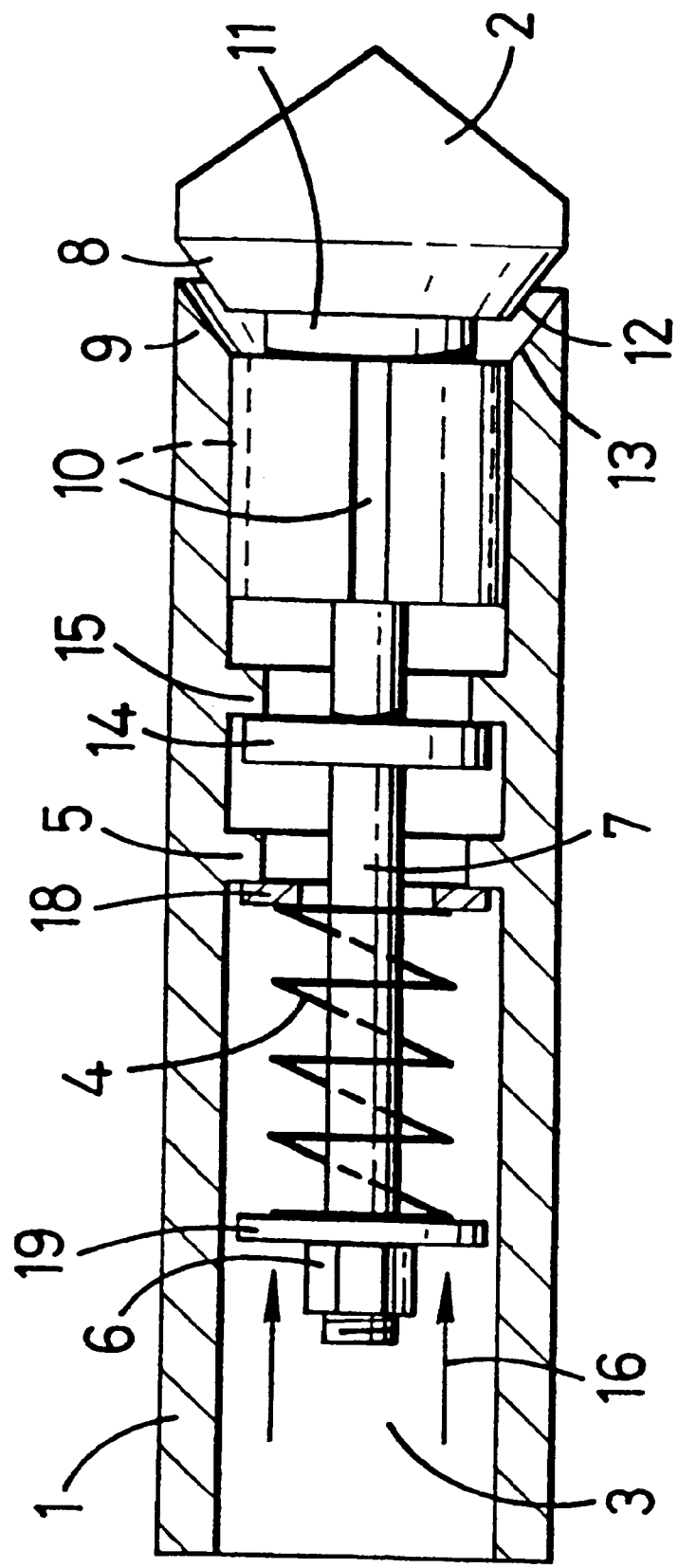
FIG. 2 illustrates diagrammatically another non-limiting example of a nozzle use in an horizontal position.

The appended FIG. 2 constitutes another non-limiting example of an horizontal nozzle according to the process of the present invention.

Figure 3:
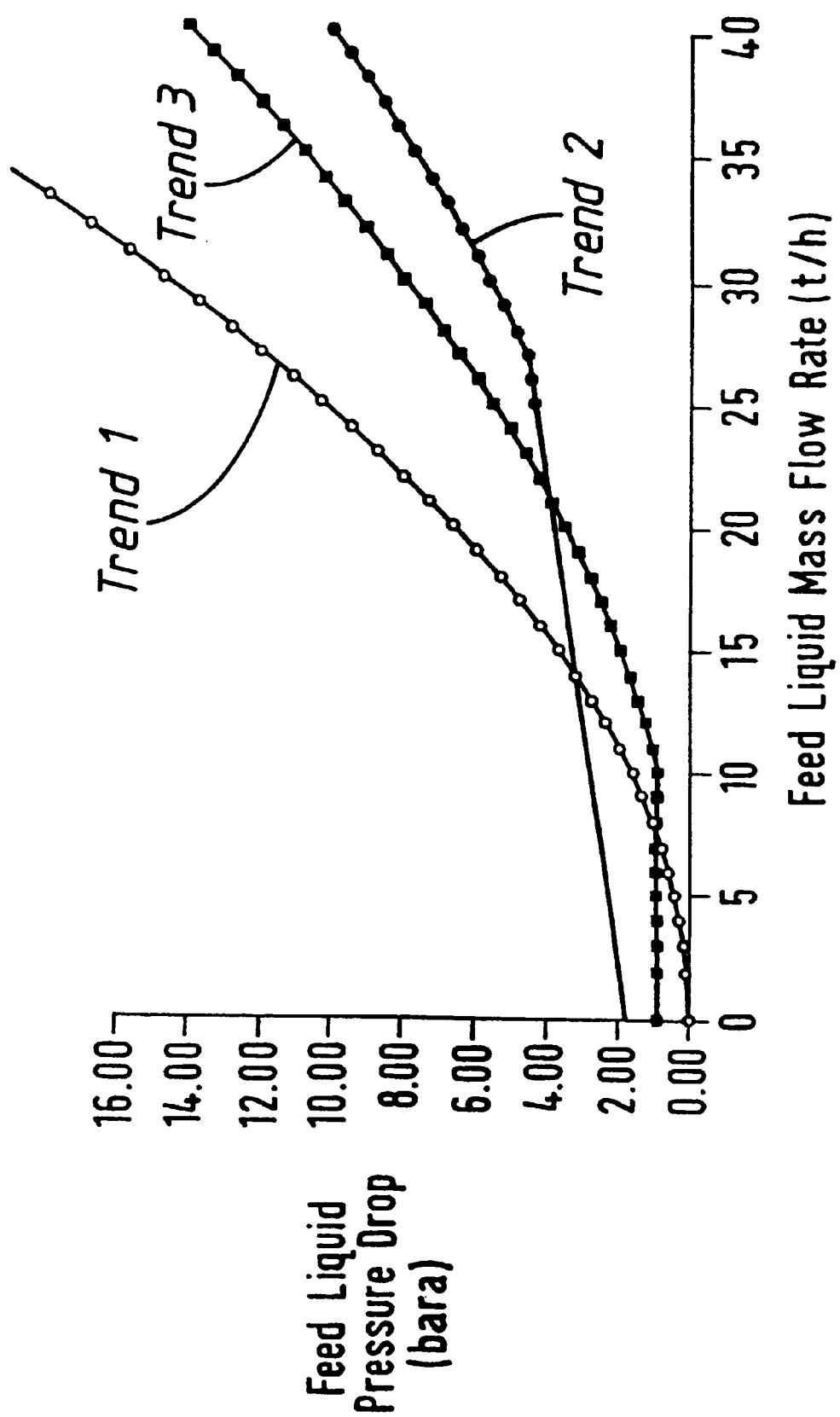
FIG. 3 presents trends of the liquid pressure drop versus the liquid flow rate through a non-limiting selection of nozzles.

The appended FIG. 3 presents trends of the feed liquid pressure drop versus the liquid flow rate through a non-limiting selection of nozzles.

The feed liquid pressure drop is a differential pressure drop between the feed liquid in the feed pipe and the pressure of the fluidised bed. The trends in FIG. 2 have been obtained from a selection of three nozzles tested under polymerisation conditions in a fluidised bed of growing polymer particles.

Trend 1 corresponds to a nozzle of the prior art, without any spring valve device. The feed liquid pressure drop through this nozzle had an exponential increase with the liquid flow rate. This type of nozzle is not particularly adapted to limit the feed liquid jet in the fluidised bed.

Trend 2 corresponds to a nozzle according to the present invention having an inlet feed pipe of 68 mm, a preloaded spring with a setting pressure equal to 2 bar and a maximum opening clearance of 1.9 mm. This nozzle allowed a linear increase of the feed liquid pressure drop thus, a good control of the feed liquid jet in the fluidised bed, up to a feed liquid flow rate of 27 Tonne/hr. The relative stiffness of the spring allowed to achieve a minimum liquid pressure drop through the nozzle at low feed liquid flow rate and consequently minimised the length of the feed liquid jet.

Trend 3 corresponds to a nozzle according to the present invention having an inlet feed pipe of 68 mm, a preloaded spring with a setting pressure equal to 1 bar and a maximum opening clearance of 1.6 mm. The stiffness of the spring was very low compare to the nozzle of trend 2. This allowed to limit the feed liquid jet in the fluidised bed as soon as the liquid started to flow through the nozzle, by achieving a maximum opening clearance at low feed liquid flow rate.

What is claimed is:

1. A continuous process for the gas-phase polymerization of an olefin monomer chosen from (a) ethylene, (b) propylene, (c) a mixture of them, or one or more other alpha-olefins in combination with (a), (b) or (c), in a fluidized-bed reactor, comprising polymerizing said olefin monomer in the gas phase in a fluidized bed reactor, continuously recycling the gas phase which supports the fluidized bed and passes through the bed, the gas phase having been heated in contact with a polymerization catalyst under reactive conditions and with polymer particles being formed, by cooling the recycled gas phase, and introducing liquid into the reactor by means of at least one nozzle comprising a feed pipe and a sleeve sliding inside and at the end of said pipe, the position of said sleeve along the feed pipe being determined by the pressure of the feed liquid and the return force of a preloaded spring, said preloaded spring having one end fixed to the sleeve and the other end to the feed pipe, the sleeve being provided with one or more recesses along its surface for sliding with the feed pipe, said recesses emerging in a groove around the circumference of the sleeve and below a circular stop integral with the same sleeve, wherein, i) when the pressure of the feed liquid is not high enough to move the sleeve, the said circular stop rests on a rim of the end of the feed pipe to prevent liquid from passing out of the nozzle, said rim and the circular stop of the sleeve each being provided with a bearing surface, the contact area of which is minimized to allow good sealing, and ii) when the pressure of the feed liquid is high enough to move the sleeve, the circular stop is displaced from the rim of the end of the feed pipe and the liquid is conveyed by the recesses as far as the groove in the sleeve and then is dispersed from between the bearing surfaces.

2. The process of claim 1, wherein the gas phase which supports the fluidized bed and passes through the bed is continuously recycled by cooling recycled gas phase to a temperature at which some liquid condenses and separating the condensed liquid from the gas phase, said condensed liquid being introduced directly into the fluidized bed by said nozzle.

3. The process of claim 1, wherein the number of recesses is between 2 and 8.

4. The process of claim 3, wherein the number of recesses is between 4 and 6.

5. The process of claim 1, wherein the contact area of the bearing surfaces between the rim of the end of the feed pipe and of the circular stop of the sleeve is minimized by a chamfer in the groove on an inside surface of the said rim.

6. The process of claim 1, wherein movement of the sleeve is limited by a blocking device.

7. The process of claim 1, wherein a catalyst or a prepolymer is introduced directly in the fluidized bed with said nozzle.

8. The process of claim 1, wherein the fluidized bed reactor has from 2 to 8 nozzles.

9. The process of claim 1, wherein the nozzles are oriented in a vertical position.

10. The process of claim 9, wherein dispersion of the liquid from the nozzle is 360 degrees.

11. The process of claim 1, wherein the nozzles are oriented in a horizontal position.

12. The process of claim 11, wherein dispersion of liquid from the nozzle has the shape of a horizontal hollow cone.

* * * * *